Patented Sept. 2, 1930

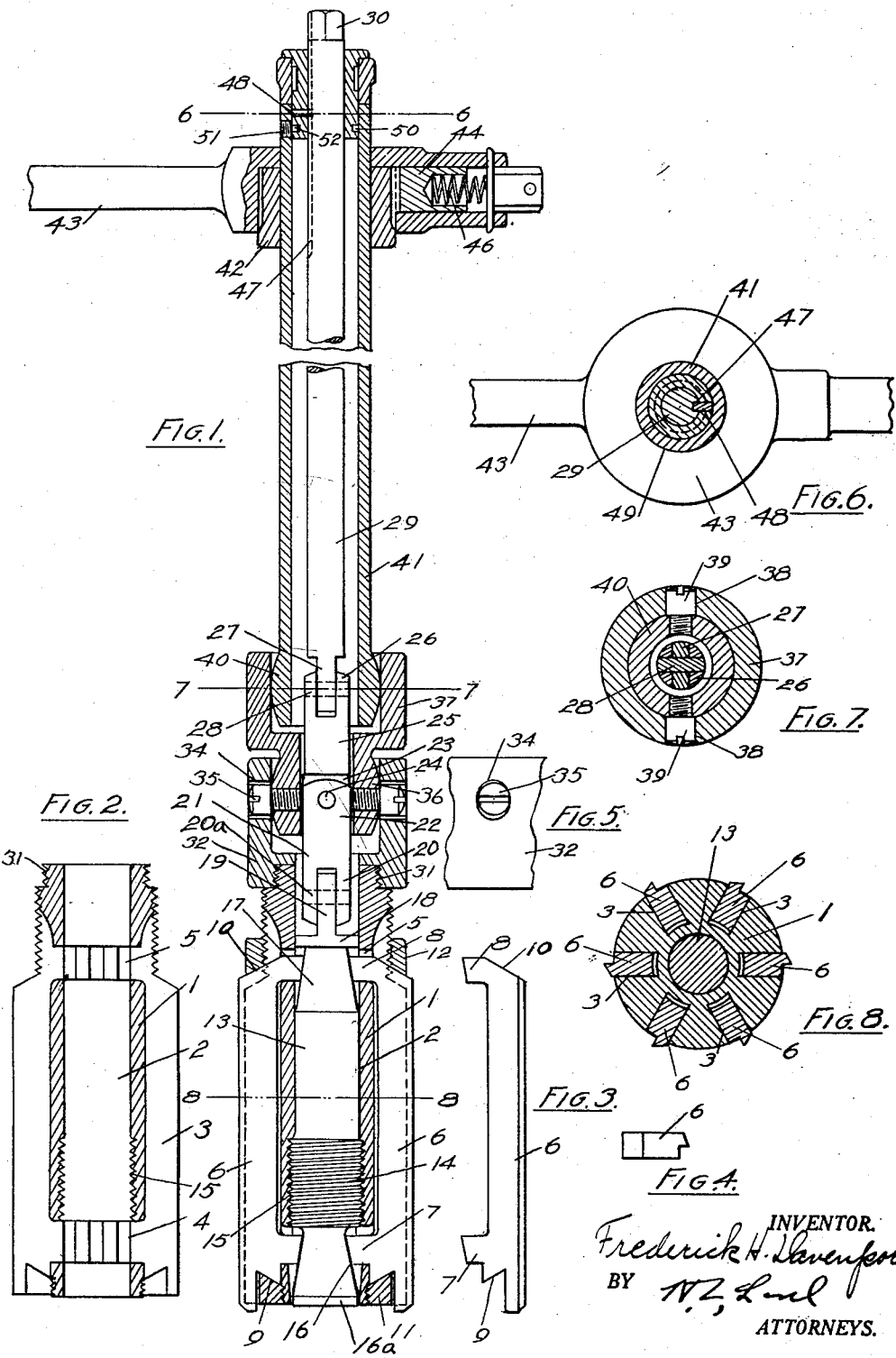

1,774,701

UNITED STATES PATENT OFFICE

FREDERICK H. DAVENPORT, OF MEADVILLE, PENNSYLVANIA

EXPANDING REAMER

Application filed January 18, 1928. Serial No. 247,614.

The present invention is designed to improve the construction of expansible reamers and the manner of driving the same. Features and details of the invention will appear from the specification and claims.

A preferred embodiment of the invention is illustrated in the accompanying drawings as follows:—

Fig. 1 shows a central section through the reamer.

Fig. 2 shows a central section of the cutter carrier, or reamer head.

Fig. 3 shows a side elevation of one of the cutters.

Fig. 4 shows an end view of one of the cutters.

Fig. 5 shows a detached view of a part of one of the joints.

Fig. 6 shows a section on the line 6—6 in Fig. 1.

Fig. 7 shows a section on the line 7—7 in Fig. 1.

Fig. 8 shows a section on the line 8—8 in Fig. 1.

1 marks the head, or carrier. This has a central opening 2 through it. It has the axially arranged cutter receiving slots 3. The cutter receiving slots are connected by slots 4 and 5 with the central opening 2. Cutters 6 are arranged in the slots 3 and these have projections 7 and 8 which extend through the slots 4 and 5 into the opening 2. The cutters are provided with the tapered ends 9 and 10 and these are engaged by rings 11 and 12 which are screwed on to the head, the head being provided with the operating screws for this purpose.

An adjusting pin 13 is arranged within the opening 2. This has the screw threads 14 which operate in screw threads 15 in the walls of the opening. The pin has the tapered portions 16 and 17 which engage the tapered ends of the projections 7 and 8. The pin also has the cylindrical portions 16ª and 18 at the ends of the tapered portions 16 and 17 and these give to the tapered portion of the pin a double support so as to resist uneven thrusts upon the tapered portions from the cutters. A tongue 19 extends from the pin 13. Ears 20 on a connecting piece 21 extend each side of the tongue 19 and a pin 20ª (see dotted lines) extends through the ears and tongue forming a pivotal joint. The upper end of the connecting piece 21 is provided with ears 22 and these are arranged each side of a tongue 23 on a second connecting piece 25. A pin 24 extends through the ears 22 and tongue 23 forming a pivotal connection at this point. The upper end of the connecting piece 25 is connected with ears 26 which extend each side of a tongue 27 and a pin 28 extends through the tongue and ears forming another pivotal joint. The tongue 27 is formed on a rod 29 which terminates in a square 30 forming a wrench-hold for turning the rod. It will be seen, therefore, that by turning the rod 29 the pin 13 may be rotated through the articulated joint so as to adjust the tapered portions 16 and 17 and thus adjust the cutters.

The head terminates in a screw-threaded end 31 and a sleeve 32 is internally screwthreaded at its end and screwed on to the end 31. The sleeve has the slots 34 through which screws 35 extend. The screws are screwed into spherically arranged ends 36 of a second sleeve 37. The second sleeve has slots 38 through which screws 39 extend, these screws extending into a spherical end 40 on the end of a sleeve 41. Thus the sleeves with these pivotal connections form a double joint and permit also of a rocking movement so that each of the sleeve joints is, in effect, a universal joint.

A ratchet wheel 42 is fixed on the upper end of the sleeve. An operating handle 43 is journaled over the ratchet wheel and carries a ratchet pawl 44. A spring 46 operates on the pawl so as to yieldingly force it into engagement with the ratchet wheel. By operating this handle manually the reamer may be turned.

The rod 29 has a key-way 47. A pin 48 extends through a head 49 into this key-way. Thus the head is slidingly mounted on the rod but locked against rotation therewith. The head is provided with a groove 50 and a screw 51 having a small extension 52 is arranged in the wall of the sleeve 41. The extension locks the head 49 in place in the sleeve and the screw when tightened locks the head against rotation and thus locks the rod 41 against rotation and this in turn locks the pin 13 in any adjustment to which it may be brought.

What I claim as new is:—

1. In an expanding reamer, the combination of a cutter head having axially extending cutter receiving slots, a central opening having a wall between it and the cutter receiving slots, and connecting slots leading from the cutter receiving slots to the central opening; an adjusting pin in the central opening having tapered portions from which the connecting slots radiate, the walls of the opening being in supporting contact with the pin between the tapered portions; a screw thread on the pin between the tapered portions operating on a screw thread in the walls of the opening for adjusting the pin; cutters in the receiving slots having projections extending through the connecting slots into contact with the tapered portions of the pin, said cutters extending to approximately the end of the reamer and the projections being adjacent to the ends of the cutters, and means locking the cutters in adjustment.

2. In an expanding reamer, the combination of a cutter head having axially extending cutter receiving slots, a central opening having a cylindrical wall between the opening and the cutter receiving slots, and connecting slots leading from the cutter receiving slots to the central opening; an adjusting pin in the central opening having tapered portions from which the connecting slots radiate and cylindrical portions each end of the tapered portions engaging the cylindrical walls of the opening; a screw thread on the pin between the tapered portions operating on a screw thread in the walls of the opening for adjusting the pin; cutters in the receiving slots having projections extending through the connecting slots into contact with the tapered portions of the pin, said cutters extending to approximately the end of the reamer and the projections being adjacent to the ends of the cutters; and rings having wedging engagement with the ends of the cutters secured on the head, the ring opposing the tapered portion of the pin having a screw adjustment.

3. In an expanding reamer, the combination of a cutter head having axially extending cutter receiving slots, a central opening having a cylindrical wall between the opening and the cutter receiving slots, and connecting slots leading from the cutter receiving slots to the central opening; an adjusting pin in the central opening having tapered portions from which the connecting slots radiate and cylindrical portions between and at each end of the tapered portions engaging the cylindrical walls of the opening; a screw thread on the pin between the tapered portions operating on a screw thread in the walls of the opening for adjusting the pin; cutters in the receiving slots having projections extending through the connecting slots into contact with the tapered portions of the pin, said cutters extending to approximately the ends of the reamer and the projections being adjacent to the ends of the cutters; and rings having wedging engagement with the ends of the cutters secured on the head, the ring opposing the tapered portion of the pin having a screw adjustment.

4. In an expanding reamer, the combination of a cutter head having axially extending cutter receiving slots, a central opening having a wall between it and the cutter receiving slots, and connecting slots leading from the cutter receiving slots to the central opening; an adjusting pin in the central opening having tapered portions from which the connecting slots radiate, the walls of the opening being in supporting contact with the pin between the tapered portions; a screw thread on the pin between the tapered portions operating on the screw thread in the walls of the opening for adjusting the pin; cutters in the receiving slots having projections extending through the connecting slots into contact with the tapered portions of the pin, said cutters extending to approximately the end of the reamer and the projections being adjacent to the ends of the cutters; and means locking the cutters in adjustment, said means being operable with the reamer assembled.

5. In an expanding reamer, the combination of a cutter head having axially extending cutter receiving slots, a central opening having a wall between it and the cutter receiving slots, and connecting slots leading from the cutter receiving slots to the central opening; an adjusting pin in the central opening having tapered portions having substantially equal diameters and from which the connecting slots radiate, the walls of the opening being in supporting contact with the pin between the tapered portions; a screw thread on the pin between the tapered portions operating on a screw thread in the walls of the opening for adjusting the pin; cutters in the receiving slots having projections extending through the connecting slots into contact with the tapered portions of the pin, said cutters extending to approximately the end of the reamer and the projections being adjacent to the ends of the cutters; and means locking the cutters in adjustment.

In testimony whereof I have hereunto set my hand.

FREDERICK H. DAVENPORT.